3,336,121
THICKENING AGENTS FOR LIQUID HYDROCARBONS

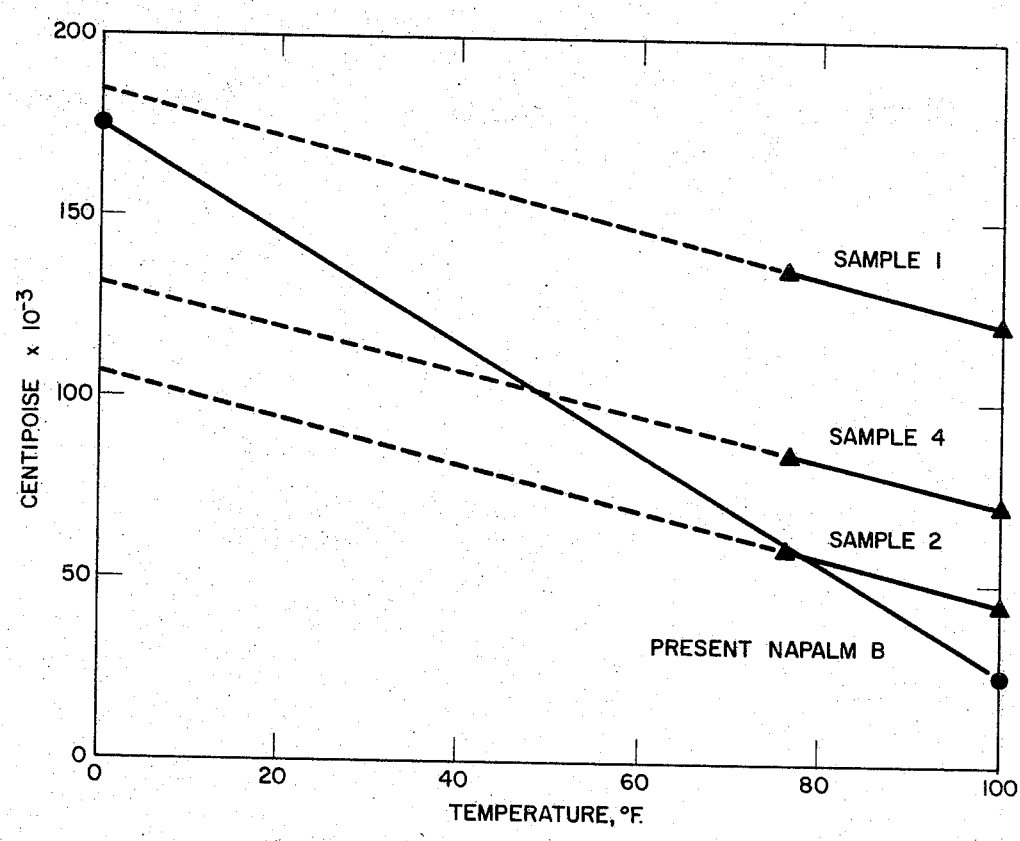

Norman Jacobson, East Brunswick, Darrell William Brownawell, Scotch Plains, and Edward N. Kresge, Elizabeth, N.J., assignors to Esso Research and Engineering Company, a corporation of Delaware
Filed July 28, 1966, Ser. No. 568,639
4 Claims. (Cl. 44—7)

This invention relates to thickening agents for liquid hydrocarbons which are useful as the charge in incendiary missiles, flame throwers, napalm, as the fuel in rockets and aircraft, and the like. More particularly, this invention is directed to a novel process for thickening normally-liquid hydrocarbons, and mixtures thereof such as petroleum fractions, and to the thickened compositions prepared thereby.

It has been known to thicken normally-liquid hydrocarbons to render them more suitable for utilities requiring a semi-solid product. In the past, this thickening process has been carried out with the aid of so-called "thickening agents" or "gelling agents" such as natural and synthetic rubber, metallic fatty acid soaps, and the like. An effective thickening or gelling agent should provide the following characteristics:

(1) Remain stable in storage in finely divided granular form.

(2) Disperse readily in liquid hydrocarbon to form a gel in a reasonable time.

(3) Form a gel of suitable consistency.

(4) Remain stable in a gel form while in storage, i.e., not reject the hydrocarbons solvent and form undesirable phases.

(5) Contain ingredients which are readily available in quantity and which are of uniform quality.

While the prior art suggests thickening or gelling agents which have provided satisfactory thickened compositions, they have suffered from certain definite disadvantages. Generally, the known thickening agents have suffered from the lack of one or more of the above enumerated desired characteristics. In addition, foremost among other disadvantages was the relatively large proportion of thickening agent required to provide a suitably thickened composition. In the instance of the preparation of napalm, the heretofore known thickening agents suffered from a very low heat of combustion which seriously affected the effectiveness of the napalm as a weapon.

In view of the above, a principal object of this invention is to provide a novel process for thickening normally-liquid hydrocarbons, employing a novel thickening agent, whereby thickened hydrocarbon compositions having improved properties are obtained. A further, and more specific, object of the invention, is to provide a thickening or gelling agent which exhibits unusual stability and consistency when dispersed in liquid hydrocarbon solvents. A further object of the invention is to provide a process for thickening liquid hydrocarbons which requires the use of less thickening agent than heretofore and which does not appreciably lessen the heating value of the resultant thickened composition. An overall object, therefore, is to provide a novel thickening agent of relatively greater effectiveness than those presently known. These and other objects and benefits will become more readily apparent from the reading of the following detailed description of the invention.

In accordance with the present invention, normally-liquid hydrocarbons, and mixtures thereof, can be thickened by admixture with a very small proportion of certain ethylene-alpha-olefin copolymers, particularly certain ethylene-propylene copolymers in accordance with the method hereinafter described. In general, the heterogeneous admixture consisting of a liquid hydrocarbon, or mixture of hydrocarbons and ethylene-alpha-olefin copolymers, in certain proportions, is heated to an elevated temperature and vigorously agitated for a relatively short period of time. After agitation at the elevated temperature, the now substantially homogeneous mixture is cooled, with or without continued vigorous agitation to an intermediate elevated temperature where the agitation is stopped. The mixture is then permitted to cool further, slowly and under quiescent conditions, to room temperature. In appearance, the product is a homogeneous, semi-solid gel which can be used, as is, in the various applications for which the semi-solid products of the present invention are employed. It is noteworthy that the scope of the present discovery is limited to copolymers of ethylene and lower alpha-olefins, especially ethylene-propylene copolymers as hereinlater described, inasmuch as polymers of other olefins, such as polyethylene, polypropylene, and certain of the polybutenes, and the like, have been found to be completely ineffective for substantially all of the purposes of the instant invention.

The liquid hydrocarbons which can be thickened in accordance with the invention include pure hydrocarbons of any structural configuration, and mixtures of any and all such types, boiling within the range of from about 80° F. to about 950° F. at atmospheric pressure. Straight- or branched-chain paraffins and olefins, cycloparaffins and aromatic hydrocarbons can thus be thickened in accordance with this invention. Non-limiting examples of such hydrocarbons are: Pentane, hexane, octane, decane, iso-pentane, iso-octane, triptane, pentene-1, 2-methylbutene-1, hexene-1, heptene-1, octene-1, cyclopentane, cyclohexane, benzene, toluene, xylene and the like. Various fractions of naturally-existing mixtures of hydrocarbons, such as certain fractions of petroleum, can also be satisfactorily thickened in accordance with the invention. Petroleum fractions boiling within the above-stated permissible atmospheric boiling range, including gasoline, kerosene and lubricating oil fractions, are particularly suitable for use. Gasoline fractions generally comprise mixtures of hydrocarbons boiling within the range of from about 80° F. to about 440° F., at atmospheric pressure, while kerosene has an atmospheric boiling range of from about 350° F. to about 550° F. Lubricating oil fractions of petroleum are usually designated light, medium or heavy, having atmospheric boiling ranges, respectively, of, from about 550° F. to about 750° F.; from about 525° F. to about 850° F.; and from about 575° F. to about 950° F. Mixtures of such petroleum fractions in any and all proportions can also be suitably thickened in accordance with this invention. However, it is preferred that mixtures of petroleum fractions which comprise a lubricating oil fraction should also contain gasoline, to provide the volatility characteristics required in most applications for thickened hydrocarbon fuels.

The copolymers which are suitable for use in thickening liquid hydrocarbons in accordance with this invention are the solid, relatively high molecular weight, semi-crystalline copolymers of ethylene and one or more alpha-olefins, e.g., $C_3$–$C_{10}$ alpha-olefins such as propylene, butene-1, isobutylene, and the like. Ethylene-propylene copolymers having the foregoing characteristics are especially preferred. The polymers suitable for use herein have about a 5 to 35% crystalline orientation as evidenced by their crystalline appearance under X-ray examination.

Accordingly, at least partial crystallinity in the polymer is necessary for the present invention. Polymers having no crystallinity such as polyisobutylene and polybutadiene and the like, somewhat thicken hydrocarbon fluids, but do not effectively gel these fluids. On the other hand, polymers containing an excessive amount of crystallinity, such as polyethylene or isotactic polypropylene are insoluble in hydrocarbon fluids and do not gel these fluids.

Ethylene-alpha-olefin copolymers containing less than about 5% crystallinity are soluble in hydrocarbon fluids but are inefficient as gelling agents. Ethylene-alpha-olefin copolymers containing over about 35% crystallinity tend to reject hydrocarbon fluids.

The procedure which may be utilized for examining the degrees of crystallinity in the polymer is similar to that of Weidinger and Hermans, Makromolecular Chem. 50, 98 (1961). The method of determining the crystalline fraction in the ethylene/propylene copolymer sample consists of:

(1) Obtaining an X-ray diffractogram of the ethylene/propylene copolymer sample.

(2) Measuring the amorphous and crystalline areas of the diffractogram.

(3) Calculating the percent crystallinity from these measurements.

The above method is based upon the analysis of a series of diffractograms of ethylene/propylene copolymer samples which vary in crystallinity. The data is normalized to the same absorbance. A plot of the thus normalized crystalline area versus the normalized amorphous gives a linear relation between the two quantities. This allows the calculation of the crystalline fraction in any other sample from the observed crystalline and amorphous areas. The solid semi-crystalline ethylene-alpha-olefin, e.g., ethylene-propylene copolymers are further characterized by the molecular weights of their composite polymers, which generally fall within the range of from about 5,000 to about 500,000 (intrinsic viscosity method) and preferably fall within the range of from 50,000 to 300,000 (intrinsic viscosity). Any of the above-defined solid, semi-crystalline polymers of ethylene and alpha-olefin are suitable for use in practicing this invention although ethylene-propylene copolymers containing less than 91% ethylene are preferred and ethylene-propylene copolymers containing between 60 and about 90% ethylene are especially preferred. It is noteworthy that mixtures of ethylene-propylene copolymers having different ethylene contents may be effectively employed providing the ethylene content of the final composite resides within the foregoing parameters and providing the remaining necessary characteristics are fulfilled.

The solid, semi-crystalline ethylene-alpha-olefin copolymers, e.g., ethylene-propylene copolymers, employed as thickening agents in the instant invention can be prepared by a variety of well-known polymerization techniques. Accordingly, such techniques do not, per se, constitute a portion of the instant invention, although the polymers resulting from the use of such techniques are necessary for the success of the invention.

Generally the polymers of alpha-olefins employed herein are prepared at low temperatures and pressures in the presence of any of a variety of catalyst compositions. The processes are conducted at temperatures ranging from about ambient temperatures to about 120° C. and pressures below 500 p.s.i., and usually a pressure in the order of 3–5 atmospheres. The catalysts are designated in the art generally as "Ziegler catalysts" or "low pressure catalysts." Such catalysts are capable of polymerizing ethylene with alpha-olefins as propylene, butene-1, styrene and other alpha-olefins. As the technology relating to the polymerization of propylene and other alpha-olefins by the use of the low pressure catalysts is substantially the same, this invention will be described as it relates to the production of ethylene-propylene polymers, but it will be readily understood that the invention is of general application to the polymerization of ethylene-alpha-olefin copolymers thereof using the low pressure catalysts and low pressure methods.

Representative "low pressure" catalysts may be selected, for example, from A through C as follows:

A. The reaction product of (1) a compound of a metal selected from Groups IV, V, VI and VIII of the Mendeleeff Periodic Table and manganese with (2) a compound of the formula $R_1R_2AlX$ wherein $R_1$ and $R_2$ each are selected from the group consisting of hydrogen and hydrocarbon and X is selected from the group consisting of hydrogen, halogen, alkoxy, aryloxy, the residue of a secondary amine, amide, mercaptan thiophenol, carboxylic acid and sulfonic acid.

B. The reaction product of (1) a compound of a metal from Groups IV, V, VI and VIII of the Mendeleeff Periodic Table and manganese with (2) a compound selected from the group consisting of aluminum trialkyl, magnesium alkyl, zinc alkyl and Grignard compound.

C. A composition comprising aluminum trichloride, titanium tetrachloride, and aluminum.

Briefly, the low pressure polymerization processes comprise bringing into admixture any of the low pressure catalysts, together with feedstocks of ethylene and propylene. If elevated temperatures and pressures are to be employed, then the reaction vessel is equipped with suitable inlets, outlets, pressure gauges, heating and cooling means, and the like. The catalyst compositions are most conveniently prepared by merely mixing the catalyst component in an inert hydrocarbon solvent. The thus formed catalyst slurry is then added to the polymerization vessel. As it relates to catalyst composition prepared from, for example, aluminum diethyl chloride and vanadium tetrachloride, the two ingredients may be added separately to a suitable vessel containing an inert hydrocarbon such as pentane, hexane, isobutane, benzene, toluene, and the like. If desired, the components may be mixed in a separate vessel in the presence of the solvent whereupon there is formed a complex which constitutes the catalyst composition. The complex, which may range from a violet to a black-like color, may be aged before it is added to the reaction vessel. However, it is advantageous to merely add the hydrocarbon solvent containing the catalyst directly to the polymerization vessel. After the polymerization is complete the polymerization products are withdrawn from the reaction vessel. The polymerization product comprises a mixture of the polymer, such as ethylene-propylene hydrocarbon solvent, catalyst and catalyst remnants. At this stage of the process, the polymer may be characterized by a dark color which is attributed to the presence of catalyst residues. Accordingly, it is conventional to wash the polymer with a lower alcohol such as methanol, butanol or the like, whereupon a reaction occurs whereby the catalyst remnants are solubilized. Thereafter a simple filtration or water washing separates the alcoholic solution of the catalyst remnants from the polymer.

In accordance with the invention, one of the critical aspects in conjunction with the low pressure methods for the copolymerization of ethylene and alpha-olefins is that of molecular weight control. It is known that in the copolymerization of olefins molecular weight of the copolymer produced may be varied according to the ratio of the catalyst-forming components employed to form the catalyst mixture. Thus, when an aluminum alkyl, or aluminum alkyl halide, is used with a vanadium compound, the molecular weight of the copolymer increases with an increasing molar ratio of aluminum to vanadium. By similar processing techniques such matters as yield per unit of catalyst, density of the polymer, etc. may be influenced.

As previously indicated, the prior art methods for the low pressure copolymerization of ethylene and alpha-olefins comprise conducting the polymerization at temperatures below about 150° C. and pressure below 500 p.s.i.g. Normally however, temperatures range from about 30° C. to about 100° C. and pressures in the order of about 5–25 p.s.i.g. The low pressure catalyst is formed by merely mixing the catalyst components in a solvent as isooctane, benzene, toluene or other hydrocarbons or chlorinated hydrocarbons. The mixture may be allowed to age for a short period. In the preferred embodiment the low pressure catalyst is prepared from an aluminum trialkyl or an aluminum dialkyl halide and a vanadium salt, particularly a vanadium chloride.

When using a low pressure catalyst formed by mixing, for example, aluminum diethyl monochloride and vanadium tetrachloride as the catalyst-forming components and, after allowing the mixture to age for a short period (e.g. ½ to 1 hour), suspending the resulting catalyst in a solvent such as isooctane, benzene or a light petroleum distillate boiling between 90–110° C., each catalyst-forming component being present to the extent of 0.5 to 20 millimoles and preferably about 5 millimoles per liter of the resulting complex (with an Al:V molar ratio of about 5), the amount of alcoholate and alcohol (when present) is preferably between 0.05 and 2.0 millimoles per millimole of aluminum or vanadium.

In the preferred procedure, the catalyst is prepared from an aluminum alkyl and a vanadium salt. The aluminum compound preferably contains alkyl radicals of 1 to 10 carbon atoms and includes for example aluminum trimethyl, aluminum triethyl, aluminum triisopropyl, aluminum triisoctyl, aluminum diethyl chloride, aluminum diisopropyl bromide, and the like. The vanadium compound is preferably a vanadium halide such as vanadium tetrachloride, or vanadium oxyhalide such as vanadium oxytrichloride.

It is known that the low pressure polymerization processes are capable of producing products having a variety of physical properties by reason of the numerous variables which are involved. Thus although one may use a technical grade olefin as the feed it is generally preferred to use a vey pure alpha-olefin and also very pure catalyst forming component as well as pure optional components of the polymerization reaction mixture such as the alcohol. The mixture of olefins should be as free as practical of other unsaturated hydrocarbons and also free of any nonhydrocarbon organic compounds. In view of the numerous variables which may affect the overall processes and products it will be found to be desirable to first conduct the processes on a small scale whereby the effect of such variables as the catalyst feedstocks and their relative proportions may be determined. Once these factors have been determined on a small scale then one may proceed on a larger scale.

While only the solid, semi-crystalline copolymers of ethylene-alpha-olefins are effective as thickening agents for normally-liquid hydrocarbons in accordance with the present invention, it has been found that the presence of relatively low molecular weight, oily or amorphous copolymers does not significantly interfere with the thickening process herein disclosed. Hence, for the purposes of this invention, it is not necessary to remove the amorphous copolymers from the semi-crystalline copolymers. Copolymers consisting of as much as 80 percent of the amorphous variety with the essential crystalline polymers have provided satisfactory thickening when employed in accordance with the method of the invention.

In practicing the invention, the semi-crystalline copolymers, with or without accompanying amorphous copolymers, are first admixed, while agitating, with the liquid hydrocarbon or mixture of such hydrocarbons. Generally, weight ratios of hydrocarbon:thickening agent of from 5:1 to about 99:1 are suitable, although hydrocarbon:thickening agent ratios above about 20:1 are preferred. After admixing the hydrocarbon and polymer, the heterogeneous mixture is slowly heated to a temperature in excess of about 130° F., but below about 215° F. if the polymer is in powdered form. When the liquid hydrocarbon to be thickened is a predominantly saturated hydrocarbon, such as a cyclic or acyclic paraffin hydrocarbon, or is a mixture of hydrocarbons predominating in such types, excellent results are obtained when the admixture of hydrocarbon and powdered polymer is heated to a temperature only slightly in excess of 140° F. With aromatic hydrocarbons, or mixtures predominating therein, superior results are achieved when the powdered copolymer is heated to temperatures in excess of about 140° F., say about 170° F., or is first dissolved in a suitable solvent for the copolymer, e.g., a saturated hydrocarbon. In either case, if the copolymer is in pelletized form, it is preferred to heat the admixture to a temperature in excess of 140° F. to first dissolve the copolymer. During heating, and while the admixture is at an elevated temperature, sufficient pressure should be applied to the system to prevent vaporization of the more volatile hydrocarbons. After heating, the admixture is vigorously agitated at the elevated temperature for a short period of time, for example, from about 5 minutes to about 45 minutes.

When the admixture of copolymer and hydrocarbon has been heated and vigorously agitated at the elevated temperature, the resulting homogeneous mixture of solution is permitted to cool to room temperature. Continued agitation is not necessary but may be carried out, preferably below about 150° F., in the case of predominantly aromatic hydrocarbons, or down to preferably below about 150° F. in the case of predominantly saturated hydrocarbons. At the lower temperatures mentioned above, the agitation is stopped and the incipient semi-solid gel is permitted to further cool in a state of quiescence. Substantially all of the liquid hydrocarbon will have been incorporated in the gel, but any excess can conveniently be drained off. To obtain a gel of even drier feel, the product can be processed through parallel, separated squeeze rollers under very mild pressure. The product so obtained is in a form convenient for either storage or immediate use as a thickened hydrocarbon composition.

As mentioned, a specific embodiment of the thickened hydrocarbons of the instant invention resides in their use in hydrocarbon incendiary bombs, e.g., napalm. Hydrocarbon incendiary bombs, especially those dropped from high speed airplanes, have several restrictive requirements which, if not fulfilled, seriously restrict the effectiveness of same. For example, the presently used incendiary material, i.e., napalm-B, which is composed of 50% polystyrene, 25% benzene and 25% gasoline fails to meet several of such restrictive requirements. The ideal napalm formulation would have the following properties: (1) viscosity of from about 50,000 to about 20,000 centipoises at 25° C.; (2) as little variation of viscosity with temperature as possible; (3) no change in viscosity with storage or aging; (4) stability to oxidation (particularly as it affects viscosity); (5) a flash point of below about 100° F., and; (6) clean burning. Generally, it is found that the most important requirement is that of minimization of the change in viscosity with temperature change. For example, it is found that the major drawback of napalm-B which is composed of 50% polystyrene, 25% benzene and 25% gasoline is an undesirable excessive change of viscosity with change in temperature. As mentioned, the present invention overcomes undesirable aspects of the prior art thickening agents in that hydrocarbons thicken with the ethylene-alpha-olefin, especially ethylene-propylene copolymers, have relatively little variation of viscosity with temperature and concomitantly with none of the other drawbacks evidenced by the prior art thickening agents. In addition, the thickening agents of the instant invention represent extremely potent thickeners so that relatively small amounts of polymer are required to thicken the hydrocarbon. In this regard, comparative tests evidence that use of from about 1 to about 10% of the ethylene-propylene thickening agent of this invention is as effective as 50% of a polystyrene thickening agent. Thus, the ethylene-propylene thickening agents of the instant invention provide little variation of viscosity with change in temperature and are further desirable in that they are stable to oxidation, storage and aging; are clean burning, and; the flash point thereof can be adjusted by a choice of solvent utilized.

The following Table I illustrates the dependence of viscosity for selected ethylene-propylene copolymers on temperature and shear rate.

TABLE I

| Sample | Components of Sample (percent) | | Total Percent Polymer | Temperature equals 77° F. Vis. cp.×10⁻³ Shear Rate | | | | Temp. equals 100° F. Vis. cp.×10⁻³ Shear Rate 5 r.p.m. |
|---|---|---|---|---|---|---|---|---|
| | A¹ | B² | | 1 r.p.m. | 2 r.p.m. | 5 r.p.m. | 10 r.p.m. | |
| 1 | 4.0 | 1.0 | 5 | 350 | 220 | 135 | 90 | 120 |
| 2 | 4.3 | 0.7 | 5 | 130 | 110 | 65 | 40 | 44 |
| 3 | 4.5 | 0.5 | 5 | 75 | 65 | 45 | 31 | 16 |
| 4 | 1.0 | 4.0 | 5 | 210 | 145 | 85 | 60 | 70 |

¹ Ethylene-propylene: About 60 wt. percent ethylene; about 150M mol. wt. Mv.
² Ethylent-propylene: About 90 wt. percent ethylene; about 250M mol. wt. Mv.

The data in Table I show that the viscosities required for napalm-B can be obtained with the polymer of this invention at several different shear rates. A comparison of the viscosity at 5 r.p.m. at two different temperatures show a desirably low dependence of viscosity with temperature. See, for example, the accompanying drawing, incorporated herein by reference, which illustrates the relative effect of temperature on viscosity of hydrocarbons thickened with ethylene-propylene copolymers and of napalm-B. In the drawing, the samples described in Table I are utilized and are compared with napalm-B which comprises 50% polystyrene, 25% benzene and 25% gasoline. The surprisingly beneficial effect evidenced by ethylene-propylene copolymers in comparison with the napalm-B should be readily apparent from the slopes of the lines represented in said drawing.

In order to further illustrate the use of high ethylene content copolymers as gelling agents for hydrocarbon fluids, an ethylene-propylene copolymer was prepared by a modified Ziegler synthesis using an aluminum sesquichloride/vanadium tetrachloride catalyst system. Such ethylene-propylene copolymers prepared at 112° F. in an n-heptane solution. Said alkyl aluminum chloride ($Al_2Et_3Cl_3$) and vanadium tetrachloride were used as catalysts with a ratio of Al/V of 5.0. Hydrogen was employed (20 cc./min.) to control the molecular weight to one of about 150,000 (viscosity average). The reaction was terminated with methanol and the polymer recovered by steam distillation of the solvent. The polymer contained 89.4 mol percent ethylene as measured by infrared absorption.

The following data set forth in Table II illustrate the gelling ability of the polymer. Each of the samples in Table II were heated to a temperature of 65–70° C. to dissolve the polymer and were then allowed to cool to ambient temperature.

TABLE II

| Sample No. | Conc.¹ (wt. percent) | Solvent | Comments |
|---|---|---|---|
| 1 | 1.0 | Hexane | No gel. |
| 2 | 5.0 | do | Solid gel at room temperature. |
| 3 | 2.0 | Ref. Oil 135² | Do. |
| 4 | 1.0 | do² | No gel at room temperature. |

¹ Ethylene-propylene copolymer containing 89.4 mole percent ethylene.
² Reference Oil 135: A solvent extracted, netural, paraffinic type oil containing conventional additives having a viscosity of about 174.9 SUS at 210° F. with about 45.31 SUS at 100° F. and a viscosity index of about 113.

The foregoing data clearly illustrate the utility of ethylene-propylene copolymers as effective gelling agents for hydrocarbons. Concomitantly, these data show effect of concentration on the effectiveness of the copolymer of this invention.

In order to illustrate another specific embodiment of the invention, about 1 part by weight of an ethylene-propylene polymer comprising 85 mol. percent ethylene and having a molecular weight of about 50,000 (number average) is dissolved in 2 parts hexane with excess hexane being subsequently removed by distillation and nitrogen stripping. Said ethylene-propylene copolymer is then admixed with about 50 parts by weight of a gasoline consisting of a petroleum fraction boiling in the range of from about 90° F. to about 400° F. at atmospheric pressure. The admixture is vigorously agitated at an elevated temperature for a period of about 15 minutes. The resulting homogeneous mixture is then slowly cooled to room temperature. The resulting product gel is suitable for use as a thickened hydrocarbon fuel.

In addition, the gel as prepared above, is also particularly suitable for use as the charge in incendiary missiles provided with means for ignition on impact. The same gel, comprising thickened gasoline, can also be employed as a solid propellant for rockets. In the latter embodiment, an oxidizer such as aluminum or potassium chlorate is intimately admixed with the homogeneous mixture of gasoline and crystalline ethylene-propylene copolymer. The composition containing the oxidizer is formed into a cylindrically-shaped semi-solid propellant "grain." This grain can be readily ignited by means of black powder which has been ignited by conventional means. The grain is usually burned from one end to provide a constant area of burning surface.

Another specific embodiment relates to improved lubricant compositions, e.g., lubricants having improved extreme pressure characteristics, which are formed from a suitable base oil, the ethylene-alpha-olefin copolymers of the present invention and, if desired, an extreme pressure lubricant additive. The resulting lubricant compositions evidenced surprising stability, e.g., exhibit a paucity of sediment development, undesirable precipitates, and the like.

What is claimed is:

1. A semi-solid composition which comprises a normally liquid hydrocarbon boiling within the range of from about 80° to about 950° F. and an ethylene-alpha-olefin copolymer thickening agent; said copolymer being characterized as containing from about 60 to about 90 wt. percent ethylene, and having a molecular weight in the range of from about 5,000 to about 500,000, and a degree of crystallinity within the range between about 5 and 35%, the weight ratio of said hydrocarbon to said thickening agent being from about 5:1 to about 99:1.

2. The composition of claim 1 wherein said alpha-olefin is propylene.

3. The composition of claim 2 wherein said copolymer has a molecular weight within the range between about 50,000 and 300,000.

4. The composition of claim 3 wherein the weight ratio of said hydrocarbon to said thickening agent is greater than 20:1.

References Cited

UNITED STATES PATENTS 2,791,576   5/1957   Field et al. _____ 252—59
3,084,033   4/1963   Kelly et al. _____ 44—7
3,232,720   2/1966   Kepple _____ 44—7

DANIEL E. WYMAN, *Primary Examiner.*

C. F. DEES, *Assistant Examiner.*